Patented Dec. 26, 1950

2,535,290

UNITED STATES PATENT OFFICE 2,535,290

PLASTIC COMPOSITION

Reginald W. Ivett and William Koch, Wilmington, Del., assignors to Hercules Powder Company, Wilmington, Del., a corporation of Delaware No Drawing. Application February 26, 1947, Serial No. 731,040

17 Claims. (Cl. 106—189)

This invention relates to the stabilization of cellulose ethers and, more particularly, to the production of cellulose ethers and their compositions which retain their viscosity and good color during and after exposure to heat, light, oxidation, weathering and other degrading influences.

Cellulose ether compositions and particularly ethyl cellulose compositions have found considerable usefulness where the properties of toughness, dimensional stability and flexibility at extremely low temperatures are desirable. However, when subjected to elevated temperatures, prolonged exposure to ultra-violet light or aging in general, there has been a discoloration and/or viscosity degradation which has limited their usefulness to a considerable extent. Thus, compositions depositing a colorless mass from solution have given relatively dark amber masses much like tortoise shell upon being molded at temperatures of the order of 200–300° C. In addition, there has been considerable loss of viscosity, i. e., degradation, leading to brittle molded products. Similar discoloration and loss of viscosity, strength, and flexibility also result from prolonged storage or exposure to ultraviolet light and weathering. The problem of stabilization is particularly difficult where relatively high heats are required, as in fast molding, or when the material is exposed for prolonged periods to severe weathering conditions.

In the past viscosity stabilization has been effected to some extent by the addition of certain amines and certain phenolic bodies. In most cases these have tended to add color themselves or have contributed to the formation of color in the cellulose ether. In the few cases where color development has been less than that obtained where no stabilizers were used, the extent of color improvement has been insufficient and has been obtained largely under moderate, rather high, heat conditions.

Some attempts have been made to improve color by treatment with bleaching agents and by treatment with acids. Where such improvements in color have been retained in the molding operation, they have resulted in such extreme loss of viscosity that a relatively useless molded product results. Even mildly bleaching, slightly acidic agents, such as sulfur dioxide, have been found to cause crazing, scorched dark spots, brittleness; i. e., local or general degradation at molding temperatures of 200° C., and above, either immediately or on normal aging. As a result, it has not been possible to prepare clear, colorless, molded ethyl cellulose articles or even to prepare molded ethyl cellulose articles in pale or pastel shades. Ethyl cellulose molded articles have, therefore, been made only in pigmented or dark colors.

Now, in accordance with this invention, a method has been found whereby ethyl cellulose and other thermoplastic cellulose ethers and their compositions may be effectively stabilized against discoloration and viscosity degradation when exposed to heat and weathering. Thus, it has been found that these materials may be molded at elevated temperatures such as 200° C. and above to form tough, shaped articles very greatly improved in color after molding as compared with previous molded compositions of this nature. As a result it is now possible to successfully prepare clear, relatively colorless moldings and moldings in light and pastel shades. This is accomplished by adding to or incorporating with the cellulose ether a small amount of diisobutylphenol, alone or in combination with a sulfur dioxide-producing compound. When used alone the diisobutylphenol exerts a very definite stabilizing effect on cellulose ethers and their compositions, protecting them from crazing of the surface, discoloration and degradation when exposed to heat, light, air, weathering and other degrading influences. Optimum results are obtained, however, when the diisobutylphenol is used in combination with small amounts of a sulfur dioxide-producing compound.

The stabilization of the cellulose ethers may be accomplished in a number of ways. For example, when diisobutylphenol alone is used, the cellulose ether may be dissolved in a suitable solvent to which the diisobutylphenol is added, after which solvent is removed. Alternatively, the cellulose ether may be suspended in water or a swelling medium, such as aqueous alcohol and a solution of the stabilizer added to the suspension for absorption by the cellulose ether. Again the stabilizer may be added during a tumbling, stirring, or other similar operation for distributing the stabilizer through the granular cellulose ether. Incorporation of the stabilizer at some stage of manufacture is desirable, since it frequently happens that the cellulose ether is stored for considerable periods before use, and the presence of an effective stabilizer prevents any substantial degradation due to aging.

Stabilization may also be effected during preparation of the product in which the cellulose ether is eventually employed. For example, in the preparation of cellulose ether lacquers, molding powders, etc., the stabilizer may be added to the finished lacquer or to the lacquer solvent during or prior to dissolving the other lacquer ingredients; to the mixture of ingredients prior to or during formation of a molding powder, etc.

When stabilization is effected by the combined use of diisobutylphenol and sulfur dioxide the preferred method of accomplishing the result of this invention comprises incorporating a compound which decomposes at a temperature of 200° C. with evolution of sulfur dioxide, for example, an aliphatic sulfone such as butadiene sulfone, and diisobutylphenol in the cellulose ether molding composition, and then molding the composition under heat. By this method, a small amount of sulfur dioxide is released under the heat of the molding operation. Obviously, a compound releasing sulfur dioxide at below 200° C. will release it at 200° C. or on being heated thereto. In molding, the temperature will be at least sufficient to cause release of sulfur dioxide from the particular compound used. Thus, there is provided a thermoplastic cellulose ether molding composition containing both the compound capable of releasing sulfur dioxide and the diisobutylphenol. Such a composition is capable of being molded to strong, tough articles which may be of pale color or a pastel shade or of very greatly reduced color in the case of clear articles.

Alternatively, a cellulose ether composition containing diisobutylphenol may be molded while passing a small stream of sulfur dioxide into the molding chamber or into a chamber or hopper by which the thermoplastic composition is led to the molding chamber. A similar result is obtained by subjecting a molding powder of the cellulose ether composition to an atmosphere of sulfur dioxide, whereby it absorbs some of the sulfur dioxide, and then molding the composition by compression, injection, or extrusion under heat before the absorbed sulfur dioxide has been lost.

In view of the acidic nature of sulfur dioxide and in view of the fact that phenolic bodies are, in general, of an acidic rather than basic nature, it is surprising and unexpected that the use of diisobutylphenol alone or in combination with sulfur dioxide in cellulose ether compositions at molding temperatures brings about formation of tough, undegraded products of improved color. Heretofore, it has been the experience in this field that acids caused severe degradation, sometimes accompanied by discoloration, when cellulose ethers were exposed to heat or aged. Furthermore, although considerable improvement in stability characteristics and particularly color are obtained by the use of diisobutylphenol alone, it has been found that optimum stability improvement is obtained when diisobutylphenol and a sulfur dioxide releasing compound are used in combination.

The invention will be illustrated by the examples of preparation of molding compositions and preparation of molded articles therefrom which follow. All parts and percentages given are by weight.

EXAMPLE 1

Ethyl cellulose having 46.8% to 48.5% ethoxyl content and 100 centipoises viscosity was dissolved in 80:20 toluene: alcohol. Diisobutylphenol was added to a portion of the solution to give a composition containing 1% diisobutylphenol, based on the weight of the ethyl cellulose. Films about 3 mils in thickness were then cast from the composition, and portions of the films thus formed were heated for 48 hours at 120° C. in air. Films of the ethyl cellulose containing no stabilizer were also heated under the same conditions. Viscosities of the samples before and after heat treatment were determined and from these figures the viscosity retention was obtained. Flexibility and discoloration were also noted. Table I below compares the results obtained with the stabilized and unstabilized ethyl cellulose.

TABLE I

Evaluation of diisobutylphenol as stabilizer for ethyl cellulose after heating for 48 hours at 120° C. in air

| Sample | Flexibility | Discoloration | Per cent Viscosity Retention |
|---|---|---|---|
| Unstabilized | Flexible | Very Slight | 12.2 |
| Diisobutylphenol (1%) | do | Nil | 62.8 |

Portions of these samples were also exposed to ultra-violet light in a Fade-Ometer machine for 50 hours. Flexibility, discoloration and per cent viscosity retention were determined as before and are set forth in Table II below.

TABLE II

Evaluation of diisobutylphenol as stabilizer for ethyl cellulose after exposure in the Fade-Ometer for 50 hours

| Sample | Flexibility | Discoloration | Per Cent Viscosity Retention |
|---|---|---|---|
| Unstabilized | Flexible | Nil | 16.5 |
| Diisobutylphenol (1%) | do | do | 36.2 |

EXAMPLE 2

The following ingredients were colloided on a two-roll mill at 290–310° F. for 20 minutes, dried, chipped into a molding powder, and molded into discs at 400° F. for 10 minutes.

| | Parts |
|---|---|
| Ethyl cellulose (44.5 to 45.5% ethoxyl, 100 centipoises viscosity) | 85 |
| Dibutyl phthalate | 15 |

Similar compositions were prepared and molded containing (1) 2% diisobutylphenol, (2) 0.03% butadiene sulfone, and (3) 2% diisobutylphenol and 0.3% butadiene sulfone.

All samples were exposed to the S-1 sun lamp-fog box cycle (2 hours in the fog chamber, 2 hours irradiation under the S-1 lamp, 2 hours in the fog chamber, 18 hours irradiation) for 120 hours. Color of discs after molding and color and condition of discs after exposure to S-1 sun lamp-fog box cycle were determined and are set forth in Tables III and IV below. Colors were measured on the spectrophotometer, and values are expressed as luminous transmittance and as the red trichromatic coefficient. The former value represents the amount of light that each disc will transmit, and the red coefficient represents the per cent of red in the total color value of the sample.

TABLE III

Color of disc after molding (spectrophotometer)

| Sample | Luminous Transmittance, Percent | Trichromatic Coefficient (Red) |
|---|---|---|
| Unstabilized | 31.5 | .4442 |
| 2% Diisobutylphenol | 53.1 | .3973 |
| 0.3% Butadiene sulfone | 67.8 | .3573 |
| 2% Diisobutylphenol and 0.3% butadiene sulfone | 70.3 | .3497 |

TABLE IV

*Color and condition of discs after exposure to S-1 sun lamp-fog box cycle (spectrophotometer color values)*

| Sample | Luminous Transmission, per cent | Change (Units) | Trichromatic Coefficient (Red) | Change (Units) | Condition |
|---|---|---|---|---|---|
| Unstabilized | 21.9 | −9.6 | .4430 | −.0112 | Very badly crazed. Slightly bleached. |
| 2% Diisobutylphenol | 52.4 | −0.7 | .3714 | −.0159 | Surface OK. Slightly bleached. |
| 0.3% Butadiene sulfone | 49.3 | −18.5 | .3469 | −.0104 | Very badly crazed. Bleached. |
| 2% Diisobutylphenol and 0.3% butadiene sulfone. | 59.4 | −10.9 | .3544 | +.0047 | Surface OK. Slightly darkened. |

The unstabilized sample and the sample containing 0.3% butadiene sulfone became badly crazed. The samples containing 2% diisobutylphenol alone and in combination with 0.3% butadiene sulfone were still in good condition and only slightly discolored.

The method and compositions of this invention call for use of cellulose ethers of the thermoplastic type and of sufficient degree of polymerization to yield tough, molded articles. In general, cellulose ethers soluble in any of the common organic solvents, such as acetone, benzene, toluene-alcohol, methanol, ethanol, ethyl acetate, butyl acetate, and the like, are of the required thermoplastic type. Ethyl cellulose having an ethoxyl content between about 37% and about 52%, preferably between about 43% and about 48% and having a viscosity of at least about 20 cp., is particularly suitable. However, thermoplastic propyl cellulose, ethyl propyl cellulose, ethyl butyl cellulose, methyl ethyl cellulose, and benzyl cellulose are likewise useful in molding compositions, and, like ethyl cellulose, their molding compositions are very greatly improved in color of the molded product by proceeding in accordance with this invention. It is desirable that the cellulose ethers be so prepared or purified as to eliminate any substantial proportion of free acid. Thus, treatment with strong acids should be avoided unless there is subsequent neutralization of any free acid groups by basic ions, such as sodium, calcium, magnesium, cesium, copper, and the like.

The stabilizers according to the present invention may be incorporated before, during or after preparation of the cellulose ether compositions or while the cellulose ether compositions are being molded or otherwise formed into finished plastic articles. Diisobutylphenol is utilized in amounts varying from about 0.5% to about 5.0% of the weight of the cellulose ether. Preferably, it is employed in amounts between about 1% and about 3%, 1% usually being the optimum quantity to obtain satisfactory stability and other required characteristics. Larger amounts than about 5% produce no substantial additional stabilizing effect, while amounts below about 0.5% usually do not create the desired degree of stabilization.

When sulfur dioxide is included substantially similar amounts of diisobutylphenol will be utilized in order to obtain maximum stability characteristics. Sulfur dioxide may be provided as such at the time of molding by flushing the molding equipment therewith or by subjecting molding powder to a stream of sulfur dioxide. Likewise, flake ethyl cellulose may be saturated with gaseous sulfur dioxide prior to incorporating it into a molding composition. Usually, it is more convenient to incorporate in the molding composition a compound which will decompose at the molding temperature to form sulfur dioxide. Such a compound may be incorporated in the cellulose ether at the time it is manufactured, or it may be incorporated during the preparation of the molding composition. Either of the latter procedures has the advantage of providing the cellulose ether with a color protective influence during the milling needed to form a molding powder.

Any compound which is substantially colorless, which does not discolor under heat, and which does not in itself function as an acid stronger than sulfurous acid is suitable. The sulfones of aliphatic compounds, such as those derived from butadiene, piperylene, isoprene, 2-methyl pentadiene, amyldiene, or other diene hydrocarbons, are particularly useful since they release sulfur dioxide freely at 200° C. without leaving any appreciable residue. Polypropylene sulfone, polyalkyl-polysulfones generally, and cyclic dipropylene sulfone are effective. Aliphatic sulfonates provide another group of compounds which, in most cases, give off sulfur dioxide at 200° C.; such sulfonates as sodium sulfodiethyl succinate, sodium sulfodipropyl succinate, sodium sulfodibutyl succinate, sodium sulfodiamyl succinate, sodium sulfodihexyl succinate, sodium sulfodioctyl succinate, sodium sulfodilauryl succinate, equivalent potassium compounds, and similar derivatives of substituted succinates, have been found particularly suitable since the residue is quite compatible in the cellulose ether compositions and, in fact, functions as a plasticizer. These compounds may be prepared by condensation of sodium bisulfite with the corresponding esters of maleic acid. Any aliphatic or alicyclic sulfonate which will release sulfur dioxide upon heating is suitable. Alkyl and other organic sulfites, for example, dimethyl sulfite, diethyl sulfite, dibutyl sulfite, methyl bisulfite, ethyl bisulfite, acetone bisulfite, normal-heptaldehyde bisulfite, and sodium formaldehyde sulfoxylate, were found to function by release of sulfur dioxide at 200° C. Inorganic compounds, such as sodium bisulfite, sodium meta-bisulfite, potassium bisulfite, calcium bisulfite, sodium hydrosulfite, and the like, which are capable of releasing sulfur dioxide upon heating at 200° C. have also been found suitable. The inorganic materials are of use in pale pigmented molding compositions but tend to add haze to compositions intended for clear moldings.

The quantity of sulfur dioxide or sulfur dioxide-releasing material will, in general, be quite small but may vary considerably with the particular compound utilized. It is most easily expressed on the basis of the content of sulfur dioxide in free or combined form, and, on this basis at least about 0.005% by weight of sulfur dioxide based upon the cellulose ether in the molding composition should be present during the molding operation in order to obtain improvement in color of the molded article. Preferably, a quantity between about 0.05% and about 0.5% of sulfur dioxide based on the weight of the cellulose ether will be utilized, it being understood that this amount represents only the sulfur dioxide content of the actual compound present. In general, no more than about 0.2% of sulfur dioxide in loosely combined form need be present, and in view of the possibility of corrosion of equipment by sulfur dioxide, no more than this amount will ordinarily be used. In any case, no more than 2% of combined or free sulfur dioxide should be used because of development of objectionable odor and degradation, scorching, etc. in the finished plastic.

Where gaseous sulfur dioxide is used, only a small amount need be passed through the molding composition as absorption of only very small amounts is needed. Where butadiene sulfone is used, 0.2 to 0.5% on the weight of the cellulose ether (equivalent to 0.11% to 0.27% sulfur dioxide) is an optimum quantity, some of the sulfur dioxide being released in milling to form molding powder and the remainder, or some of the remainder being released in molding. However, 0.01% to 2.0% of the sulfone, based on the cellulose ether, may be used. When sodium sulfodioctyl succinate or homologous compound is used, 0.3% to 1.0% of the compound is optimum, although 0.05% to 4.0% may be used. (This represents 0.005% to 0.29% sulfur dioxide based on the cellulose ether.) The amount may be less than in the case of butadiene sulfone, as indicated by the figures, because there is less sulfur dioxide released in milling to form molding powder, and, therefore, relatively more sulfur dioxide available in the molding operation. It will be appreciated that, depending on particular compounds, compositions, and uses, the optimum quantities will vary considerably.

It will be understood that plasticizers, such as dibutyl phthalate, diethyl phthalate, butyl stearate, triphenyl phosphate, tricresyl phosphate, raw castor oil, nonvolatile mineral oils, methyl phthalyl ethyl glycolate, hydrogenated methyl abietate, and the like, may be incorporated with the cellulose ether as usual in the preparation of plastic masses. Likewise, resins, such as the oil-soluble phenol aldehyde condensates, ester gum, hydrogenated glycerol abietate, pentaerythritol abietate, rosin, and oil-modified alkyd resins, would also be included although, as a rule, these substances are not used extensively in plastics intended for molding. Similarly, waxes, such as paraffin, microcrystalline petroleum waxes, carnauba wax, candelilla wax, montan wax and Japan wax, may also be included. Pigments, dyes, and fillers may also be included.

The method in accordance with this invention includes shaping with the aid of heat by any mechanical modification. Thus, shaping may be by compression molding under heat, injection molding, or by extrusion, drawing, and the like. Temperatures may vary from 100° to 300° C. The invention is particularly valuable in permitting molding at the relatively high but efficient and frequently necessary temperatures of the order of 190-250° C.

It will be appreciated that the compositions in accordance with this invention are also useful where heat is not essential for shaping but where a composition may be subjected to relatively high temperatures or to moderately high temperatures for long periods of time. Thus, the compositions retain good color and stability over long periods of exposure to heat and light in the form of lacquer films, electrical insulation, impregnated and coated fabric, and in film or sheeting.

It has been found that the compositions in accordance with this invention can be molded at quite high temperatures without the formation of the rather dark color as normally encountered with cellulose ethers. The compositions are also stabilized against degradation in the form of severe viscosity drop. Stability of this nature preserves toughness. Furthermore, the compositions are capable of withstanding ultraviolet light of the type encountered in exposure to sunlight and sun lamps for long periods without development of crazed surfaces, dark spots, discoloration, and other degradation. The invention permits the preparation of clear and pastel shades in thermally molded cellulose ether compositions.

Viscosities given throughout this specification are defined in terms of centipoises as determined on 5% solutions of the cellulose ether in 80:20 toluene:alcohol at 25° C. The per cent viscosity retentions were calculated by determining the viscosities of a given sample before and after treatment, such as heat-treatment, and dividing the latter by the former.

The S-1 sun lamp-fog box cycle is fully described in the Government publication dated January 24, 1944, and entitled "Federal Specification for Plastics, Organic—General Specifications—Test Methods" under test LP406a. The cycle includes exposure in a fog chamber for two hours, two hours irradiation under an S-1 lamp, two hours additional exposure in the fog chamber, followed by eighteen hours irradiation. The cycle may be repeated any number of times. The diisobutylphenol utilized in this invention is fully described in an article entitled "Diisobutylphenol, synthesis—structure—properties—derivatives" in Industrial and Engineering Chemistry, vol. 30, No. 11, pages 1269-74 (1938), by Joseph B. Niederl.

What we claim and desire to protect by Letters Patent is:

1. A composition comprising a thermoplastic cellulose ether and from about 0.5% to about 5% of diisobutylphenol, said composition being stabilized with respect to viscosity and color during and after exposure to heat, light, oxidation, and weathering by virtue of the presence therein of said diisobutylphenol.

2. A stabilized cellulose ether composition comprising a thermoplastic ethyl cellulose and from about 0.5% to about 5% of diisobutylphenol, said composition being stabilized with respect to viscosity and color during and after exposure to heat, light, oxidation, and weathering by virtue of the presence therein of said diisobutylphenol.

3. A stabilized cellulose ether composition comprising a thermoplastic cellulose ether, a sulfur dioxide-producing compound which is substantially colorless, which does not discolor under heat, which does not in itself function as an acid stronger than sulfurous acid and which releases sulfur dioxide at 200° C., in an amount at least about 0.005% and not more than 2% of the weight of the cellulose ether on the basis of the content of combined sulfur dioxide, and from about 0.5% to about 5% of diisobutylphenol, said composition being stabilized with respect to viscosity and color during and after exposure to heat, light, oxidation, and weathering by virtue of the presence therein of said diisobutylphenol and said sulfur dioxide-releasing compound.

4. A stabilized cellulose ether composition comprising a thermoplastic cellulose ether, a sulfur dioxide-producing compound which is substantially colorless, which does not discolor under heat, which does not in itself function as an acid stronger than sulfurous acid and which releases sulfur dioxide at 200° C., in an amount between about 0.005% and about 0.5% of the weight of the cellulose ether on the basis of the content of combined sulfur dioxide, and from about 0.5% to about 5% of diisobutylphenol, said composition being stabilized with respect to viscosity and color during and after exposure to heat, light, oxidation, and weathering by virtue of the presence therein of said diisobutylphenol and said sulfur dioxide-releasing compound.

5. A stabilized cellulose ether composition comprising a thermoplastic ethyl cellulose, an aliphatic diene sulfone which is substantially colorless, which does not discolor under heat, which does not in itself function as an acid stronger than sulfurous acid and which releases sulfur dioxide at 200° C., in an amount between about 0.005% and about 0.5% of the weight of the ethyl cellulose on the basis of the content of combined sulfur dioxide, and from about 0.5% to about 5% of diisobutylphenol, said composition being stabilized with respect to viscosity and color during and after exposure to heat, light, oxidation, and weathering by virtue of the presence therein of said diisobutylphenol and said sulfur dioxide-releasing compound.

6. A stabilized cellulose ether composition comprising a thermoplastic ethyl cellulose, butadiene sulfone in an amount between about 0.01% and about 2.0% of the weight of the ethyl cellulose, and from about 0.5% to about 5% of diisobutylphenol, said composition being stabilized with respect to viscosity and color during and after exposure to heat, light, oxidation, and weathering by virtue of the presence therein of said diisobutylphenol and said butadiene sulfone.

7. A stabilized cellulose ether composition comprising a thermoplastic ethyl cellulose, a sulfodialkyl succinate which is substantially colorless, which does not discolor under heat, which does not in itself function as an acid stronger than sulfurous acid and which releases sulfur dioxide at 200° C., in an amount between about 0.005% and about 0.29% of the weight of the ethyl cellulose on the basis of the content of combined sulfur dioxide, and from about 0.5% to about 5% of diisobutylphenol, said composition being stabilized with respect to viscosity and color during and after exposure to heat, light, oxidation, and weathering by virtue of the presence therein of said diisobutylphenol and said sulfur dioxide-releasing compound.

8. A stabilized cellulose ether composition comprising a thermoplastic ethyl cellulose, sodium sulfodioctyl succinate in an amount between about 0.05% and about 4.0% of the weight of the ethyl cellulose, and from about 0.5% to about 5% of diisobutylphenol, said composition being stabilized with respect to viscosity and color during and after exposure to heat, light, oxidation, and weathering by virtue of the presence therein of said diisobutylphenol and said sodium sulfodioctyl succinate.

9. A stabilized cellulose ether composition comprising a thermoplastic ethyl cellulose, an organic sulfite which is substantially colorless, which does not discolor under heat, which does not in itself function as an acid stronger than sulfurous acid and which releases sulfur dioxide at 200° C., in an amount between about 0.005% and about 0.5% of the weight of the ethyl cellulose on the basis of the content of combined sulfur dioxide, and from about 0.5% to about 5% of diisobutylphenol, said composition being stabilized with respect to viscosity and color during and after exposure to heat, light, oxidation, and weathering by virtue of the presence therein of said diisobutylphenol and said sulfur dioxide-releasing compound.

10. A stabilized cellulose ether composition comprising a thermoplastic ethyl cellulose, diethyl sulfite in an amount between about 0.005% and about 0.5% of the weight of the ethyl cellulose on the basis of the content of combined sulfur dioxide, and from about 0.5% to about 5% of diisobutylphenol, said composition being stabilized with respect to viscosity and color during and after exposure to heat, light, oxidation, and weathering by virtue of the presence therein of said diisobutylphenol and said diethyl sulfite.

11. In a process in which a thermoplastic cellulose ether composition is molded or shaped under heat and pressure normally tending to cause discoloration of the composition, the improvement which comprises shaping the composition in the presence of at least about 0.005% and not more than 2% sulfur dioxide based on the weight of the cellulose ether and from about 0.5% to about 5% of diisobutylphenol whereby said composition is stabilized with respect to viscosity and color during and after said shaping.

12. In a process in which a thermoplastic cellulose ether composition is molded or shaped under heat and pressure normally tending to cause discoloration of the composition, the improvement which comprises distributing in the composition a sulfur dioxide-producing compound which is substantially colorless, which does not discolor under heat, which does not in itself function as an acid stronger than sulfurous acid and which releases sulfur dioxide at 200° C., in an amount at least about 0.005% and not more than 2% of the weight of the cellulose ether on the basis of the content of combined sulfur dioxide, and from about 0.5% to about 5% of diisobutylphenol, and then shaping the composition under heat sufficient to cause release of sulfur dioxide in the shaping operation, whereby said composition is stabilized with respect to viscosity and color during and after said shaping operation.

13. In a process in which a thermoplastic ethyl cellulose composition is molded or shaped under heat and pressure normally tending to cause discoloration of the composition, the improvement which comprises distributing in the composition butadiene sulfone in an amount at least about 0.005% and not more than 2% of the weight of the ethyl cellulose on the basis of the content of combined sulfur dioxide and from about 0.5% to about 5% of diisobutylphenol, and then shaping the composition under heat sufficient to cause release of sulfur dioxide in the shaping operation, whereby said composition is stabilized with respect to viscosity and color during and after said shaping operation.

14. In the process in which a thermoplastic ethyl cellulose composition is molded or shaped under heat and pressure normally tending to cause discoloration of the composition, the improvement which comprises distributing in the composition sodium sulfodioctyl succinate in an amount at least about 0.005% and not more than 2% of the weight of the ethyl cellulose on the basis of the content of combined sulfur dioxide and from about 0.5% to about 5% of diisobutylphenol, and then shaping the composition under heat sufficient to cause release of sulfur dioxide in the shaping operation, whereby said composition is stabilized with respect to viscosity and color during and after said shaping operation.

15. In a process in which a thermoplastic ethyl cellulose composition is molded or shaped under heat and pressure normally tending to cause discoloration of the composition, the improvement which comprises distributing in the composition an aliphatic diene sulfone which is substantially colorless, which does not discolor under heat, which does not in itself function as an acid stronger than sulfurous acid and which releases sulfur dioxide at 200° C., in an amount at least about 0.005% and not more than 2% of the weight of the ethyl cellulose on the basis of the content of combined sulfur dioxide and from about 0.5% to about 5% of diisobutylphenol, and then shaping the composition under heat sufficient to cause release of sulfur dioxide in the shaping operation, whereby said composition is stabilized with respect to viscosity and color during and after said shaping operation.

16. In a process in which a thermoplastic ethyl cellulose composition is molded or shaped under heat and pressure normally tending to cause discoloration of the composition, the improvement which comprises distributing in the composition a sulfodialkyl succinate which is substantially colorless, which does not discolor under heat, which does not in itself function as an acid stronger than sulfurous acid and which releases sulfur dioxide at 200° C., in an amount at least about 0.005% and not more than 2% of the weight of the ethyl cellulose on the basis of the content of combined sulfur dioxide and from about 0.5% to about 5% of diisobutylphenol, and then shaping the composition under heat sufficient to cause release of sulfur dioxide in the shaping operation, whereby said composition is stabilized with respect to viscosity and color during and after said shaping operation.

17. In a process in which a thermoplastic ethyl cellulose composition is molded or shaped under heat and pressure normally tending to cause discoloration of the composition, the improvement which comprises distributing in the composition an organic sulfite which is substantially colorless, which does not discolor under heat, which does not in itself function as an acid stronger than sulfurous acid and which releases sulfur dioxide at 200° C., in an amount at least about 0.005% and not more than 2% of the weight of the ethyl cellulose on the basis of the content of combined sulfur dioxide and from about 0.5% to about 5% of diisobutylphenol, and then shaping the composition under heat sufficient to cause release of sulfur dioxide in the shaping operation, whereby said composition is stabilized with respect to viscosity and color during and after said shaping operation.

REGINALD W. IVETT.
WILLIAM KOCH.

REFERENCES CITED

The following references are of record in the file of this patent:

UNITED STATES PATENTS

| Number | Name | Date |
|---|---|---|
| 1,510,735 | Baybutt | Oct. 7, 1924 |
| 1,929,210 | Moss | Oct. 3, 1933 |
| 1,994,597 | Staud et al. | Mar. 19, 1935 |
| 2,059,619 | Trail | Nov. 3, 1936 |
| 2,151,476 | Kimble | Mar. 21, 1939 |
| 2,258,556 | Schirm | Oct. 7, 1941 |
| 2,275,716 | Bachman | Mar. 10, 1942 |
| 2,321,069 | Dreyfus | June 8, 1943 |
| 2,356,840 | Frey | Aug. 29, 1944 |
| 2,389,370 | Koch | Nov. 20, 1945 |

FOREIGN PATENTS

| Number | Country | Date |
|---|---|---|
| 741,975 | France | Feb. 24, 1933 |
| 616,786 | Germany | Aug. 5, 1935 |
| 489,974 | Great Britain | Aug. 3, 1938 |

OTHER REFERENCES

Pages 354 and 355 of Simons-Ellis' book entitled "Handbook of Plastics" (1933).

Certificate of Correction

Patent No. 2,535,290 December 26, 1950

REGINALD W. IVETT ET AL.

It is hereby certified that error appears in the printed specification of the above numbered patent requiring correction as follows:

Column 1, line 41, after the word "rather" insert *than*; column 8, line 51, before "composition" insert *stabilized cellulose ether*; column 12, line 47, list of references cited, under "OTHER REFERENCES" for "(1933)" read *(1943)*;

and that the said Letters Patent should be read as corrected above, so that the same may conform to the record of the case in the Patent Office.

Signed and sealed this 27th day of February, A. D. 1951.

[SEAL]

THOMAS F. MURPHY,
*Assistant Commissioner of Patents.*